United States Patent [19]

Biles

[11] Patent Number: 5,331,444
[45] Date of Patent: Jul. 19, 1994

[54] MOISTURE-INSENSITIVE HOLOGRAMS AND METHOD FOR MAKING THE SAME

[76] Inventor: Jonathan R. Biles, 1422 SE. Knight St., Portland, Oreg. 97202

[21] Appl. No.: 703,248

[22] Filed: May 20, 1991

Related U.S. Application Data

[63] Continuation of Ser. No. 26,216, Apr. 16, 1987, abandoned.

[51] Int. Cl.⁵ ........................... G03H 1/02; G03H 1/04
[52] U.S. Cl. .................................... 359/3; 359/1; 359/507; 359/513; 430/1
[58] Field of Search ................ 359/1, 3, 24, 507, 512, 359/513, 15, 22, 24, 32, 28; 430/2, 1

[56] References Cited

U.S. PATENT DOCUMENTS

| | | | |
|---|---|---|---|
| 3,660,091 | 5/1972 | Shankoff et al. | 350/3.61 |
| 4,269,473 | 5/1981 | Flothmann et al. | 350/3.69 |
| 4,318,970 | 3/1982 | Kurland et al. | 430/2 |
| 4,329,409 | 5/1982 | Wreede et al. | 350/3.6 |
| 4,330,604 | 5/1982 | Wreede et al. | 350/3.6 |
| 4,367,911 | 1/1983 | Graube | 350/3.61 |
| 4,530,564 | 7/1985 | Close | 350/3.69 |
| 4,789,211 | 12/1988 | Wreede | 350/3.61 |
| 4,956,040 | 9/1990 | Fry | 430/1 X |
| 5,073,222 | 12/1991 | Fry | 428/14 X |

FOREIGN PATENT DOCUMENTS 217303  10/1985  Japan ..................... 430/2

*Primary Examiner*—Martin Lerner
*Assistant Examiner*—David R. Parsons

[57] ABSTRACT

Reflection holograms to be viewed through the front side of a transparent and preferably flexible substrate, and which are insensitive to moisture in liquid and in vapor form, are produced by attaching a layer of holographic recording material to the back side of a transparent substrate, attaching a layer of moisture barrier resin to the back side of the recording material in sufficient thickness to render the hologram insensitive to moisture, and attaching a layer of opaque material to the back side of the moisture barrier layer. Further protection against moisture may be achieved by attaching a solvent deposited layer of transparent moisture barrier resin to the front side of the substrate and/or attaching a layer of moisture barrier sheet to the back side of the opaque layer.

7 Claims, 1 Drawing Sheet

MOISTURE-INSENSITIVE HOLOGRAMS AND METHOD FOR MAKING THE SAME

CROSS REFERENCE TO RELATED APPLICATION

This application is a continuation of my earlier application, Ser. No. 07/026,216, filed Apr. 16, 1987, now abandoned.

BACKGROUND OF THE INVENTION

This invention relates to holograms, and more particularly to a moisture insensitive reflection holographic article made of a material whose image is normally degraded by moisture.

Dichromated gelatin (DCG) is the best material presently available for reflection hologram display, but exposure to moisture causes loss of its image. For protection, it is usually sealed between two layers of glass with light curing epoxy. This light curing epoxy is expensive. The process is messy, and it is difficult not to trap bubbles in the epoxy layer. But because of DCG's high quality, hundreds of thousands of dichromated gelatin holograms on glass are made in the U.S.A. each year. Obtaining an easier protection from moisture would be advantageous.

It would also be advantageous to put the hologram onto a plastic substrate. A flexible plastic substrate would allow wider application such as mail, wallet, and book use. Long strips of holograms on plastic could be belt processed for a lower production cost. Because of the moisture sensitivity problem, commercial attempts in 1980 to apply DCG to plastic substrates by Dichromate Inc. of Emeryville, Calif. were abandoned. Their experiments with dip coating the holograms in common urethane sealers failed.

Because of this moisture problem, several patents have been issued to leading researchers from major corporations attempting to make DCG, or DCG-like holographic photopolymers, insensitive to ambient moisture. All four patents are different from the polymer moisture barriers discussed in this patent application.

U.S. Pat. No. 3,660,091 describes a chemical method to crosslink the gelatin and make it less sensitive to water.

U.S. Pat. No. 4,318,970 describes a technique for depositing a moisture barrier glass layer onto the preholographic substrate by electron or plasma beam deposition in a vacuum.

U.S. Pat. No. 4,330,604 discloses a moisture barrier technique similar to the previous patent in which $Si_3Ni_4$ is applied to the pre-hologram substrate instead of glass.

U.S. Pat. No. 4,535,041 discloses a technique of applying zirconium acetate and a fatty acid to a holographic photopolymer to prevent moisture from being able to penetrate the photopolymer.

None of these patents provides an inexpensive means of making a DCG hologram sufficiently insensitive to moisture, as is evidenced by the failure of DCG companies to give up the limited glass and epoxy packaging.

SUMMARY OF THE INVENTION

In its basic concept, this invention provides reflection holograms that are insensitive to ambient moisture in either liquid or vapor form, by attaching a layer of holographic recording material to the back side of a transparent rigid or flexible substrate, attaching a layer of moisture barrier resin to the back side of the recording material in sufficient thickness to achieve the desired moisture resistance, and attaching an opaque layer to the back side of the moisture barrier layer.

The principal object of this invention is to provide a moisture insensitive reflection hologram of high quality at a low cost by protecting the holographic recording material from moisture with moisture barrier polymers.

Another object of this invention is to put these holograms on flexible plastic substrates.

A further objective of this invention is to provide a reflection hologram of high quality that is insensitive to moisture in liquid form, such as rain, and in vapor from, such as atmospheric humidity, and that is capable of being provided in the form of flexible cards for mail, wallet and book use.

The foregoing and other objects and advantages of this invention will appear from the following detailed description, taken in connection with the accompanying drawings of preferred embodiments.

DESCRIPTION OF THE PREFERRED EMBODIMENTS

Figure 1:
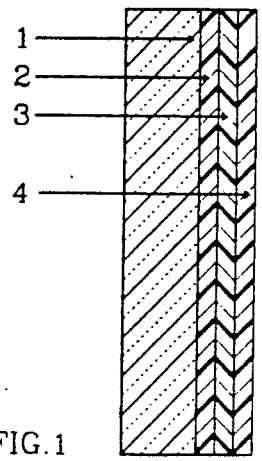
FIG. 1, in cross section, depicts a holographic article on a moisture impermeable substrate.

A key concept of this invention is the restriction to reflection holograms whose images are to be viewed through their transparent substrates, and whose backs can therefore be opaqued. This restriction is necessary because in all the holographic articles of this invention, a moisture barrier film or sheet is provided on the non-substrate (back) side of the holographic recording material. The key negative limitation of adequate moisture barriers usually used is their poor optical quality and inability to transmit a good image. However, this is overcome in this invention by employing an opaque layer behind the barrier film or sheet.

In the present invention, as is well known to those skilled in the art of holography, a reflection hologram has the reconstructed image coming out of the recording material in reflection. This means the image comes out on the same side as the reference beam entered. When this reflection hologram is designed to be viewed through its transparent substrate, as in this invention, it is obvious that both the reference beam and image traverse only the transparent substrate. Accordingly, since the image path does not extend back of the recording material layer and into the moisture barrier layer, the latter can be made as thick as necessary for moisture barrier function without introducing optical distortions which would adversely affect image quality.

It is also well known to those skilled in the art of holography that the layer of recording material is not completely opaque, and therefore some light from the back, if not blocked by the opaque layer, could pass through the moisture barrier layer and through the layer of recording material and be viewed from the front. Such distorted light could degrade the view of the hologram from the front. The moisture barrier layer is interposed between the opaque layer and the recording material to protect the hologram from water vapor leaking through the opaque layer.

The moisture barrier sheet of this invention may be held against the recording material by an adhesive dissolved in an organic solvent which can penetrate the moisture barrier sheet. As an alternative method of applying the barrier sheet, a rapidly air-drying contact adhesive is used to hold the barrier sheet against the recording material. This is a faster manufacturing step, and essential for substrates which cannot tolerate the organic solvents.

If a flexible plastic substrate is used, but is too thin to prevent moisture penetration, a film of moisture barrier resin, which is much thinner and clearer than the barrier sheet, is applied to the front of the substrate. It is usually applied with a solvent that does not degrade the hologram's image in the short time it is air drying. Unlike the barrier sheet, the film of barrier resin transmits a clear, unaltered image. The thin film of barrier resin is not as impervious to moisture as the sheet, but the substrate has some barrier properties to additionally block liquid water or water vapor from penetrating the front of the article. Because both sides can now be flexible, it is possible to manufacture a holographic decal article protected from moisture.

In explaining the motivation for his technique, patentee #3,660,091 specifically points to the failure of thin moisture barriers as not blocking enough water and thick layers as degrading the image.

The present invention successfully applies both thick and thin barrier polymers to protect the image: a thick sheet on the back where no one can see it and a thin, clear resin may be deposited on the front to add to the substrate's barrier. Invented to do this are efficient, time sequenced applications of selected solvents and barrier polymers to make an inexpensive product.

The five figures of drawings disclose five different articles using these moisture barrier polymers, beginning with conventional glass substrate holograms and moving towards thinner and more flexible articles until a decal is finally reached. In all cases the DCG hologram is to be viewed through its transparent substrate. A layer of holographic recording material is attached to the back side of the substrate, a layer of moisture barrier resin is attached to the back side of the recording material, and a layer of opaque material is attached to the back side of the barrier layer.

FIG. 1 depicts, in cross section, a holographic article on a moisture impermeable substrate. The first layer 1, is the holographic substrate. Layer 2 is the recording material whose image can be destroyed by moisture. Layer 3 is a film of moisture barrier resin. Layer 4 is an opaque layer.

This first kind of DCG hologram is often on a substrate 1 of glass. Plastic substrates, such as acrylic or polycarbonate, must be subbed for the holographic recording material 2 and thick enough to prevent moisture penetration.

After the hologram is dried completely in a low-humidity chamber, it is laid horizontally (gelatin up) and sprayed with solvent based moisture barrier resin 3 such as 3M's KEL-F or Dow Chemical's SARAN #278 resin dissolved in a solvent such as tetrahydrofuran or cyclohexanone. These solvents do not destroy the image in the short time required for their evaporation, and they dissolve the barrier resins sufficiently for spraying. Chemically, SARAN is a polymer of polyvinylidene chloride (PVDC) and KEL-F is a copolymer of chlorotrifluoroethylene and vinylidene fluoride.

These two classes of polymers: PVDC and CTFE, provide resistance to water vapor penetration much greater than any common plastic. Polyethylene, because of its aliphatic character, is the best water vapor barrier of the common polymers.

When the barrier resin is dry, an opaque layer 4 such as black industrial alkyd enamel from Rhodda Paint Company which has been diluted by a mineral spirit paint thinner is applied. The coating is applied in stages to allow drying in between coats to prevent damaging effects on the holographic image.

Figure 2:
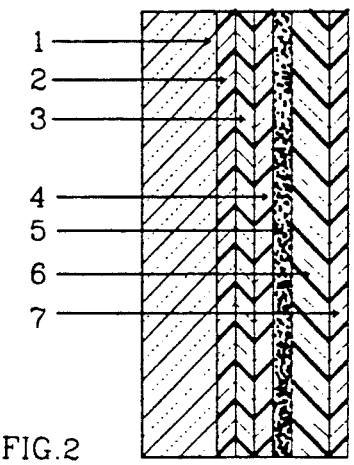
FIG. 2, in cross section, depicts a holographic article on a moisture impermeable substrate with improved moisture insensitivity because of a moisture barrier sheet attached to its back.

FIG. 2 depicts a holographic article on a moisture impermeable substrate with improved insensitivity because of a moisture barrier sheet attached to its back. Layer 1 is the holographic substrate. Layer 2 is the recording material whose image can be destroyed by moisture. Layer 3 is a film of moisture barrier resin. Layer 4 is an opaque layer. Layer 5 is an adhesive which holds the layer 6 to the holographic package. This layer 6 is a sheet of moisture barrier polymer. A final layer 7 is a protective layer.

The process is the same as for the previous figure, except that the moisture barrier sheet 6 is attached to the back of the article for additional protection. After spraying on several layers of barrier resin 3 and paint 4 until a sufficient darkness is reached, the coating is completely dried overnight. As an alternative to adhesive 5 a final spraying of paint 4 may be applied and a polymer moisture barrier sheet 6 then is rolled onto the wet paint so as to exclude air bubbles. The moisture barrier sheet is usually a SARAN sheet made by the Dow Chemical Corporation or an ACLAR (chlorotrifluoroethylene) sheet made by Allied Chemical Corporation. Although these are good barriers for water, they allow some organic solvents to penetrate through to evaporate on the air side.

The paint 4 takes several days to dry through the moisture barrier 6, depending on temperature and thickness. The adhesive solvent and opaque layer must not destroy the hologram even after contact for days, and success has been found with adhesives 5 and paints 4 whose solvents are based on alkane mixtures (mineral spirit) and/or aromatics (xylene, toluene). Ketones, chlorinated hydrocarbons, and alcohols are common solvents which are usually not suitable since they can degrade the hologram's image. Even with the suitable solvents, the opaque layer 4 must be completely dry before the next layer 6 can be deposited or the solvent can leak into the gelatin and destroy the image.

As long as the previous layer 4 of the specified dried paint was sufficiently thick, any barrier sheet 6 thickness under 4 mil passes the new paint's solvent base sufficiently fast to preserve the holographic image. A 2 mil SARAN sheet, readily available from any supermarket, is suitable.

Once the holographic article is sufficiently dry, it is trimmed around the circumference of the substrate and the back is covered with a layer 7 to protect the moisture barrier sheet. A paper or polymer protective layer is usually used.

Figure 3:
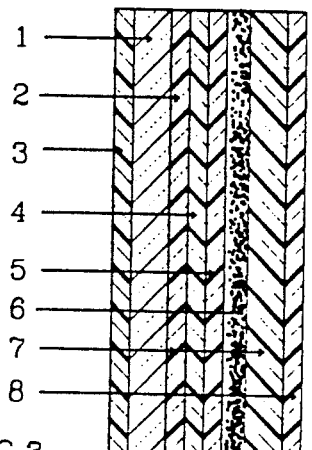
FIG. 3, in cross section, depicts a holographic article which has the front of its substrate coated with a moisture barrier resin.

FIG. 3 depicts a holographic article which has the front of its substrate coated with a moisture barrier resin. This is because its substrate (layer 1) allows so much moisture through that the hologram stored on layer 2 would be destroyed if the outer layer of the substrate were not coated with a layer 3 of moisture barrier resin. Layer 4 is another layer of moisture barrier resin. Layer 5 is an opaque layer. Layer 6 is a solvent based adhesive which holds a moisture barrier polymer sheet (layer 7), against the hologram. The final layer 8 is a protective covering.

This type of hologram is identical to the previous except that its substrate is too thin to have sufficient moisture barrier properties, so the front of the transparent holographic substrate is sprayed with a solution of a moisture barrier resin such as 3M's KEL-F or Dow Chemical's SARAN #278 resin dissolved in a solvent such as tetrahydrofuran or cyclohexanone.

The hologram is held level during the spraying and until solvent evaporates directly into the air. The most common substrate for the second type of hologram is a thin (1/64-3/16 inch) sheet of acrylic which has been subbed by any technique.

Figure 4:
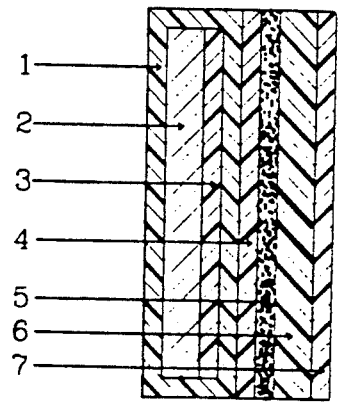
FIG. 4, in cross section, depicts a holographic article whose recording material and flexible substrate have been coated with a moisture barrier resin.

FIG. 4 depicts a holographic article whose recording material and flexible substrate have been coated with a moisture barrier resin. Layer 1 is the moisture barrier film surrounding the hologram and substrate that is left after the solvent has evaporated away. Layer 2 is the plastic substrate to which the hologram was originally attached. Layer 3 is a layer of holographic recording material. Layer 4 is an opaque coating. Layer 5 is a contact adhesive. This holds layer 6 which is a moisture barrier sheet. A final layer 7 of protective polymer is attached to the back of the moisture barrier.

The process of making the hologram begins with a substrate 2, such as a 5 mil layer of subbed polyester, which has a layer 3 of DCG attached to it that contains a reflection hologram to be viewed through the substrate.

After the hologram is dried completely in a low-humidity chamber, it is dipped into a solution of a moisture barrier resin 1 such as 3M's KEL-F or Dow Chemical's SARAN #278 resin dissolved in a solvent such as tetrahydrofuran or cyclohexanone. The hologram is dipped and dried twice to ensure complete coverage.

The hologram is then sprayed with an opaque layer 4 such as black industrial alkyd enamel from Rhodda Paint Company which has been diluted 50% by a mineral spirit paint thinner. The coating is applied in stages to allow drying in between coats to prevent damaging effects on the previous moisture barrier.

The dry paint surface is then sprayed with a fast air drying contact adhesive 5 such as 3M Photomount (catalog #6094) or Super 77 Spray Adhesive. After this dries a few seconds it has a very sticky surface.

The barrier sheet 6 is usually a SARAN sheet made by the Dow Chemical Corporation or an ACLAR sheet made by Allied Chemical Corporation. This sheet is rolled onto the adhesive with a hard rubber roller to exclude air bubbles from between the plastic layers. Thin or thick sheets may be applied with this technique.

A protective covering 7 with some flexibility is coated over the barrier sheet.

Figure 5:
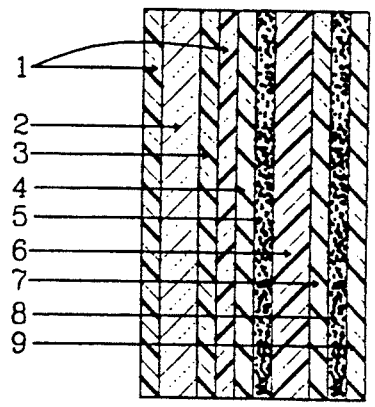
FIG. 5, in cross section, depicts a holographic article to be used as a decal.

FIG. 5 is the previous figure with additional layers to make a decal. The protective coating of layer 7 has another layer 8 of adhesive coated onto it. Layer 9 is a peel-off sheet which is applied to the adhesive to keep it clean until it is used to hold the hologram against a surface. The complete laminate is then die cut to the final size to make a decal.

With no moisture protection, DCG holograms are destroyed by a touch of the finger or by contact with breath. When sealed with a common urethane sealer such as the "VERATHANE" used by Dichromate, Inc., the hologram lasts less than an hour when immersed in water. With only a dip coat in a moisture barrier resin solution, the hologram lasts less than one day when immersed in water. In both of these cases failure may begin at the edges of the hologram, but ends by penetrating the entire area of the thin moisture barrier and destroying the image. With the full techniques disclosed here of moisture barrier resins and sheets, the moisture creeps in to the hologram from the edges only, at a rate of less than 10 mm/day when immersed in water.

The foregoing tests were done by immersing the hologram in liquid water, because any water, whether liquid or vapor, can destroy a hologram. Moreover, liquid water is a convenient test medium since the results are the same as with water vapor but are obtained in much less time and avoid the expense of providing a test atmosphere of 100% humidity with water vapor. The success of this invention is its ability to block both liquid water and water vapor effectively. Liquid water can wick in by capillary effect, and penetrate holes in a thin film layer.

Test immersion in water also assures that every surface point on the hologram is in 100% relative humidity environment. The vapor pressure is dependent only on the temperature, and the relative humidity is a ratio of the vapor pressure of water in the air to the vapor pressure of water at the temperature of the air. Since the hologram is certain to come to the temperature of the water in which it is immersed, the vapor pressure it will be exposed to is the vapor pressure of water at its temperature. This ratio is then 100%.

It will be understood by those skilled in the art, that various changes may be made in the details described here without departing from the spirit of the invention and the scope of the appended claims.

I claim:

1. A liquid water and water vapor insensitive reflection holographic article to be viewed through the front side of its transparent substrate, the article comprising:
    a) a transparent substrate having front and back sides,
    b) a layer of image developed, dry holographic recording material, whose image is capable of being destroyed by liquid water and water vapor, attached to the back side of the substrate,
    c) a film or organic polymer liquid water and water vapor barrier attached to the back side of the recording material, and
    d) an opaque layer attached to the back side of the organic polymer barrier.

2. A liquid water and water vapor insensitive reflection holographic article as described in claim 1 further comprising an organic polymer liquid water and water vapor barrier layer covering the front side of the substrate.

3. A liquid water and water vapor insensitive reflection holographic article as described in claim 1 further comprising:

e) an adhesive layer attached to the back side of the opaque layer, and f) a liquid water and water vapor barrier organic polymer sheet held against the opaque layer by the adhesive layer.

4. A liquid water and water vapor insensitive reflection holographic article as described in claim 3 further comprising an organic polymer liquid water and water vapor barrier layer covering the front of the substrate.

5. The liquid water and water vapor insensitive reflection holographic article as described in claim 1 wherein the substrate is flexible.

6. A process for making a liquid water and water vapor insensitive reflection holographic article to be viewed through the front side of a transparent substrate having front and back sides, the process comprising:

a) coating the back side of a transparent substrate with a holographic recording material, b) drying the holographic recording material, c) exposing the holographic recording material, d) developing the holographic recording material, e) drying the developed holographic recording material, f) coating the back side of the developed, dry holographic recording material with one or more layers of an organic polymer liquid water and water vapor barrier material, g) drying the barrier layer, h) coating the back side of the dry barrier layer with an opaque layer, and i) drying the opaque layer.

7. The process of claim 6 including the additional steps of:

j) coating the back side of the dry opaque layer with a layer of adhesive, and k) attaching a liquid water and water vapor barrier sheet to the adhesive layer in a way that excludes air bubble entrapment.

* * * * *